Patented Dec. 28, 1943

2,337,564

UNITED STATES PATENT OFFICE 2,337,564

STEROIDAL OXIDATION PRODUCT AND METHOD OF OBTAINING SAME

Russell Earl Marker, State College, Pa., assignor to Parke, Davis & Company, Detroit, Mich., a corporation of Michigan No Drawing. Application September 30, 1940, Serial No. 359,162

7 Claims. (Cl. 260—397.1)

This invention relates to steroidal oxidation products and method of obtaining the same. More particularly, it refers to the preparation of cyclopentanoperhydrophenanthrene derivatives having hydroxyl groups at $C_3$ and $C_6$.

An object of this invention is to prepare 3,6-dihydroxy cyclopentanoperhydrophenthrene derivatives having a carbonyl-containing substituent at C-17.

These substances are valuable as intermediates for the preparation of theapeutically valuable substances such as sex hormones and cortical hormones.

The 3,6-dihydroxycyclopentanoperhydrophenanthrene derivatives prepared by the teachings of this invention may also be designated as 3,6-di-hydroxy steroid derivatives. A large number of these are therapeutically active, or may be readily transformed into therapeutically active substances, and constitute a group of new substances, representable by the following formula,

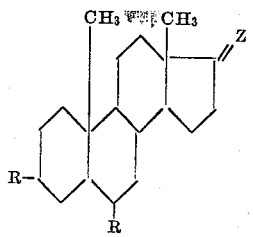

where R is selected from the class consisting of —OH and —O acyl, and Z is a carbonyl-containing substituent selected from the class consisting of

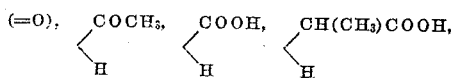

and

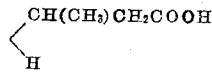

It is known that the side chain at C-17 in some sterols may be shortened by oxidizing the side chain with an oxidizing agent capable of oxidatively rupturing carbon-carbon bonds. However, the application of this mode of degradation to 3,6 dihydroxy steroids has been fruitless, for Windaus and Hossfeld, Z. physiol. Chem., 145, 177 (1925) found that, even when the hydroxyl groups were protected by acetylation, the oxidation of cholestanediol-3,6 with chromic acid gave only polycarboxylic acids, indicating that the ring system had been broken.

It has now been found that despite these adverse indications, it is possible to subject the side chain of 3,6-di-(protected hydroxy)-steroids to oxidative rupture with the production of 3,6-di-(protected hydroxy)-steroids having at $C_{17}$ a side chain - shortened carbonyl-containing substituent, without at the same time breaking open the steroid ring system.

This invention may be practiced as follows:

The 3,6-dihydroxysteroid is treated with a reagent which protects the ring hydroxyl groups, for example, an acylating agent. Then the 3,6-di-(protected hydroxy)-steroid is oxidized under relatively mild conditions, as for example, at temperatures not greatly exceeding 100° C., and for only moderate reaction-times, with an excess of a reagent capable of oxidatively rupturing carbon-carbon bonds. Such reagents are, for example, chromic acid, potassium dichromate, and potassium permanganate. The reaction mixture then is preferably treated with a reducing agent inert to carbonyl groups, such as methanol or sulfur dioxide, to destroy the excess oxidizing agent, and the mixture separated into its components, as for example, by extraction and crystallization.

The following examples serve to illustrate the invention:

Example 1

(a) To a solution of 25 g. 6-ketocholestanol-3(β), M. P. 143° C., in 300 cc. of methanol is added 1.0 g. of platinum oxide catalyst, and the mixture shaken under 3 atmospheres of hydrogen for forty-five minutes during which the diol partially separates out of solution. The mixture of catalyst and precipitated diol is collected on a Buchner funnel, and the diol leached out with warm alcohol and added to the filtrate. This combined alcoholic solution is concentrated, and on cooling, deposits a crop of crystals, which after recrystallization weigh 20 g. and have M. P. 190° C. This cholestanediol-3,6, hitherto unknown, depresses the melting point of the cholestanediol-3,6, M. P. 216° C., of Windaus (loc. cit.), and is believed to be epimeric with it in regard to carbon atom 6.

(b) The diacetate, M. P. 138° C., of this cholestanediol-3,6 is obtained by refluxing the diol with an excess of acetic anhydride and recrystallizing the product from methanol. It is believed that this diacetate differs from the diacetate, M. P. 107° C., of Windaus (loc. cit.) in regard to configuration at carbon atom 6.

(c) A solution of 200 g. of cholestanediol-3,6-diacetate, M. P. 138° C. in 3 liters of acetic acid is stirred and maintained at 90° C. while, over a five hour period, a solution of 400 g. of chromic anhydride in 400 cc. of water and 1200 cc. of acetic acid is run in. After an additional four hours of stirring, 300 cc. of methanol is added to destroy the excess chromic acid. The solution is now concentrated in vacuo to a volume of two liters, diluted with water, and extracted with ether. The ethereal extract is washed with dilute hydrochloric acid and water, then 10% aqueous sodium hydroxide is added to the ethereal extract, and the precipitated sodium salts collected and washed with sodium hydroxide solution and ether. The layers in the filtrate are separated, and the ethereal layer washed with water.

(d) The insoluble sodium salt is suspended in 1 liter of 10% methanolic potassium hydroxide, refluxed for two hours, and then 2 kg. of ice added. On acidification, there separates a flocculent precipitate which is collected, dried, and recrystallized from ethyl acetate. The yield amounts to about 12 g. This is 3($\beta$),6 dihydroxy-allo-cholanic acid, M. P. 280° C., and is identical with that obtained by the catalytic hydrogenation of $\beta$-dehydrohyodesoxycholic acid in acetic acid solution.

(e) The ethereal solution is evaporated to a syrup, and the latter dissolved in 500 cc. of hot alcohol. On cooling, crystals of unchanged cholestanediol-3,6 diacetate separate. These are collected and washed with methanol. On concentrating the mother liquor there may be obtained a small additional quantity of the unreacted diacetate. The total amount of recovered diacetate amounts to about 40 g.

The methanolic mother liquor obtained above is evaporated to dryness, then the syrupy residue steam-distilled to remove steam-volatile ketones. The residual liquor is cooled, extracted with ether, and the ethereal extract evaporated to dryness. The syrupy residue is dissolved in about 400 cc. of methanol, a solution of 15 g. of semicarbazide acetate in methanol added, and the mixture warmed on a steam bath for two hours. During this time the solution is concentrated to a volume of about 100 cc. The solution is cooled, 1 liter each of ether and water added, and the mixture filtered. The semicarbazone collected on the filter funnel is recrystallized from methanol, M. P. 222° C. The yield amounts to 4 g. It is hydrolyzed by warming for a short time with 10% aqueous alcohol sulfuric acid. The mixture is diluted with water, ether extracted, and the ether extract concentrated on the steam bath. The residue is refluxed with 200 cc. of 10% methanolic potassium hydroxide for two hours, cooled, diluted with water, and ether extracted. The ether is evaporated and the residue crystallized from diluted alcohol. It is androstanediol-3($\beta$),6-one-17 of M. P. 205° C.

The mother liquor from the purification of androstanediol-3-($\beta$)6-one-17 diacetate, semicarbazone is hydrolyzed with sulfuric acid, and the ketonic fraction isolated as before by ether extraction. The syrup thus obtained is refluxed for 20 minutes with 50 cc. of acetic anhydride, and then the acetic anhydride is distilled away in vacuo. The residue is very slowly distilled in a high vacuum and fractions collected up to 160°, 160–200°, and 200–250° C. These fractions on fractional crystallization from diluted alcohol yield androstanediol-3($\beta$),6-one-17 diacetate, allo-pregnanediol-3($\beta$),6-one-20 diacetate, and 3($\beta$),6-diacetoxy-allo-cholanyl methyl ketone respectively.

(f) The soluble sodium salt solution (the aqueous layer in the filtrate from the insoluble sodium salts) yields, on acidification, a gummy mixture of acids. These can be partially separated by high vacuum distillation and there is thus obtained, as the acid distilling at 180–250° C., 3($\beta$),6-diacetoxy-etio-allo-cholanic acid which may be purified if necessary by crystallization.

*Example 2*

(a) 6-nitrositosteryl nitrate is prepared and reduced with zinc dust and acetic acid by a method similar to that described in J. Chem. Soc. 1938, 102. The hydrolyzed product, sitostanol-3($\beta$)-one-6 is crystallized from alcohol and has M. P. 138–40° C.

(b) This sitostanol-3($\beta$)-one-6 is catalytically hydrogenated as described in Example 1. The product, sitostanediol 3($\beta$),6 is crystallized from alcohol and then has M. P. 203–5° C.

(c) Sitostanediol-3($\beta$),6, on refluxing with an excess of acetic anhydride, removal of the latter in vacuo, and crystallization of the residue from methanol, gives sitostanediol-3($\beta$),6 diacetate, M. P. 104–6° C.

(d) A solution of 100 g. of sitostanediol-3($\beta$),6 diacetate, in 3 liters of benzene is vigorously stirred and maintained at 60° C. while a solution of 180 g. of potassium permanganate and 250 cc. of sulfuric acid in 3 liters of warm water is added over a period of eight hours. After stirring overnight, the layers are separated and the benzene layer washed with water. Then 10% sodium hydroxide solution is added to this benzene extract, and the precipitated sodium salt collected. The benzene and aqueous layers in the filtrate are separated.

(e) The insoluble sodium salt is suspended in 500 cc. of 10% methanolic potassium hydroxide and refluxed for two hours. After cooling the mixture is acidified, 1 kg. of crushed ice added, and the precipitated acid collected, washed well with water, dried, and recrystallized from ethyl acetate. It is 3($\beta$),6-dihydroxy-nor-allo-cholanic acid of M. P. 225° C.

(f) The benzene layer is evaporated to dryness, and 100 cc. of methanol added. On chilling, a crystalline deposit of sitostanediol-3($\beta$),6 diacetate separates. This is collected and washed with methanol. To the combined mother liquor and washings, there is added 25 cc. of acetic acid and 15 g. of Girard's reagent T, and the whole heated for twenty minutes on the steam bath. Then ice and ether are added, and the layers separated. The ethereal layer contains mainly non-ketonic substances. The aqueous layer is made acidic by the addition of one volume of concentrated hydrochloric acid for every ten volumes of solution, and the mixture refluxed for one hour. The solution is cooled, extracted well with ether, and the ethereal extract washed with water and evaporated to leave a syrupy residue. This is refluxed for an hour with 50 cc. of 10% aqueous-alcoholic sodium hydroxide, cooled, diluted with water, and ether-extracted. The ethereal extract is washed with water, the ether removed on the steam bath, and the residue crystallized from benzene-petroleum ether to give androstanediol-3($\beta$),6-one-17, M. P. 205° C.

Example 3

(a) Hyodesoxycholic acid, M. P. 196° C. is esterified by refluxing with a 1 per cent solution of hydrogen chloride in methanol (absolute). The solvent is removed and the residual oil is crystallized from benzene. It melts at 83–86° C.

(b) To the Grignard reagent prepared by adding 730 g. of bromobenzene in 1600 cc. of dry ether to 110 g. of magnesium under 800 cc. of dry ether is added the methyl ester of hyodesoxycholic acid (from 100 g. of hyodesoxycholic acid) in benzene (dry). The mixture is refluxed for three hours, then most of the solvent is distilled off and is replaced with dry benzene. The benzene suspension of white crystalline Grignard complex is refluxed overnight, and then poured on 4 kilos of crushed ice and 300 cc. of hydrochloric acid. The mixture is extracted with ether and the ethereal extract washed with dilute hydrochloric acid, then with dilute potassium hydroxide, and finally with water. Evaporation of the solvents leaves a yellow crystalline residue which is refluxed 1.5 hours with 300 cc. of acetic anhydride. After removal of the excess acetic anhydride in vacuo, the residue is refluxed with 1 liter of acetic acid in order to dehydrate the diphenyl carbinol to the ethylenic compound. This unsaturated derivative is oxidized in 125 cc. of chloroform and 750 cc. of glacial acetic acid in 30 minutes at 15° by adding slowly a solution of 94 g. of chromic acid in 75 cc. of water and 175 cc. of glacial acetic acid.

The oxidized mixture is saturated with a sulfur dioxide while cooled in an ice bath. Approximately a liter of water is added and the solution partly evaporated in vacuo. It is extracted into ether and the ether well washed with water. The washings are extracted with ether and this ethereal extract is again washed with water. The ethereal extracts are combined and extracted with 2.5 liters of 2 N potassium hydroxide. The yellow solution is refluxed 1.5 hours and then poured into water containing 300 cc. of hydrochloric acid. The product is filtered, dried and recrystallized from ethyl acetate, giving 55 g. of nor-hyodesoxycholic acid, M. P. 196–198° C.

(c) The methyl ester of nor-hyodesoxycholic acid is prepared by refluxing 42 g. of the acid with 1 liter of 1 per cent methanolic hydrogen chloride. The methanol is completely evaporated and the residue crystallized from benzene. The ester, methyl nor-hyodesoxycholate, melts at 93–95° C. It crystallizes with one mole of benzene of crystallization.

(d) The methyl ester obtained from 40 g. of nor-hyodesoxycholic acid is added in benzene to 16 mols of phenyl lithium prepared according to Gilman, Zoellner and Selby, J. Am. Chem. Soc., 54, 1957 (1932). The mixture is then heated overnight on a steam bath, and then hydrolyzed and dehydrated as described for the analogous preparation in Example 1. The diphenyl ethylene thus obtained is not crystallized. Instead, the total product is dissolved in 55 cc. of chloroform and 325 cc. of acetic acid, and in 30 minutes at 15° C., 40 g. of chromic oxide in 30 cc. of water and 75 cc. of acetic acid is added. Sulfur dioxide is then passed into the solution to destroy the excess chromic oxide. The bis-nor acid is isolated as described for the nor acid (part b). By adding the potassium salt of the acid slowly to a mechanically stirred mixture of ice water and hydrochloric acid the bis-nor acid separates as a flocculent precipitate which is easily filtered and dried. This acid, bis-nor hyodesoxycholic acid, crystallizes from a large volume of ethyl acetate as white crystals, M. P. 240° C. Yield 17 g.

(e) Methylation of bis-nor hyodesoxycholic acid in methanolic hydrogen chloride yields an unsharply melting (120–127° C.) substance. However, methylation with excess diazomethane in ether alcohol solution furnishes a quantitative yield of the methyl ester of bis-nor hyodesoxycholic acid of M. P. 146° C. (sintering slightly at 93° C).

(f) Ten grams of methyl bis-nor hyodesoxycholate is refluxed for one hour with 25 cc. of acetic anhydride, and then 200 cc. of acetic acid added. The mixture is stirred at 85° C. for four hours while a solution of 15 g. of chromic acid in 150 cc. of 90% acetic acid is added. After stirring for four hours more at 85° C. sulfur dioxide is bubbled through the solution to destroy the excess chromic acid. Then the solution is concentrated in vacuo to a small volume. The residue is refluxed for one hour with 100 cc. of 10% methanolic potassium hydroxide. After cooling, ether and dilute hydrochloric acid are added and the layers separated. The ethereal layer is washed with sodium hydroxide solution and then with water.

(g) The ether is evaporated, and the residue heated for twenty minutes with 10 cc. of acetic anhydride. The excess acetic anhydride is removed in vacuo, and the residue heated for one hour with 100 cc. of 3% methanolic semicarbazide acetate solution during which time the solution is allowed to evaporate to a small volume. After cooling, this mixture is diluted with ether and repeatedly shaken out with water. This causes the separation of an ether-insoluble gum. The ethereal solution is poured off, evaporated to dryness, and rubbed with dry ether. This leaves a further small amount of ether-insoluble matter. The ether-insoluble substances are combined and fractionally crystallized from alcohol. Thus there are obtained two semicarbazones, corresponding to pregnanediol-3($\alpha$), 6-one-20 diacetate and etio-cholanediol-3($\alpha$), 6-one-17 diacetate respectively. On hydrolysis with aqueous-alcoholic oxalic acid these yield pregnanediol-3($\alpha$), 6-one-20 diacetate, M. P. 100° C., and etio-cholanediol-3($\alpha$), 6-one-17 diacetate respectively.

(h) The alkaline solution of the acids produced on oxidation is acidified. The gummy acid mixture which separates is dried by distilling benzene from it, and then is distilled in a high vacuum. The fraction subliming at 150–250° C. is crystallized from ether and thus yields etio-hyodesoxycholic acid of M. P. 252° C.

Example 4

(a) $\Delta^{22}$-Stigmastenedione-3,6 is prepared according to the method of Fernholz, Ann. 508, 215 (1934). This is reduced with sodium and alcohol by a method similar to that of Windaus, Ber. 50, 133 (1917) to $\Delta^{22}$-stigmastenediol-3,6.

(b) A mixture of 4 g. of $\Delta^{22}$-stigmastenediol-3,6, 4 cc. of benzoyl chloride and 20 cc. of pyridine is warmed for two hours, and then poured into dilute hydrochloric acid. The precipitate is collected and dried. It is the dibenzoate of $\Delta^{22}$-stigmastenediol-3,6.

(c) A mixture of 4 g. of the dibenzoate obtained above and 30 cc. of nitric acid is warmed on a steam bath until evolution of nitric oxide fumes ceases. The mixture is diluted with water, extracted with ether, and the ethereal layer extracted with sodium hydroxide solution. The sodium hydroxide solution is boiled for an hour and then cooled and acidified. The precipitated acid is collected and crystallized repeatedly from ethyl acetate to obtain 3($\beta$),6-dihydroxy-bis-nor-allo-cholanic acid as small white needles, M. P. 259° C. The acid may also be separated and purified by conversion with diazo-methane to its very characteristic methyl ester, M. P. 233° C.

I have found that numerous variations in the details of this invention may be made, and all of these fall within the scope of my invention. For example, there may be employed as starting materials any 3,6-dihydroxy steroid having an alkyl or substituted alkyl side chain at $C_{17}$.

Thus there may be employed cholestanediol 3($\beta$),6, M. P. 216° C., or its epimer, with regard to $C_6$, of M. P. 190° C., or hyodesoxycholic acid or other 3,6 dihydroxy steroids having an alkyl side chain which may be substituted by double bonds, hydroxyl, carbonyl, or carboxyl groups or other groups hydrolyzable to these such as esters. These 3,6-dihydroxy steroids and their 3,6-di-(protected hydroxy)-derivatives are representable by the formula

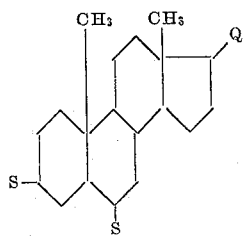

where Q is a substituent at C-17 selected from the class: (a) saturated and unsaturated unsubstituted alkyl, and (b) saturated and unsaturated alkyl substituted by a member of the group hydroxyl, carbonyl, carboxyl, and groups hydrolyzable to these, and S is a member of the group hydroxyl and groups having the dual property of being resistant to oxidation and hydrolyzable to hydroxyl.

Side chain substituted 3,6-dihydroxy steroids suitable for the practice of my invention include, for instance, the 3,6-dihydroxy derivatives of the cholanic, nor-cholanic, and bis-nor-cholanic acids, cholanyl methyl ketones, and the carbinols obtained by reduction of the latter with, for example, platinum and hydrogen.

The essential feature of the oxidation step is the attacking of tertiary hydrogens in the $C_{17}$-substituents. Thus, in the case of cholestanediol diacetate, the products formed may be accounted for by assuming that the initial oxidation occurs mainly at the points a, b, c, indicated below.

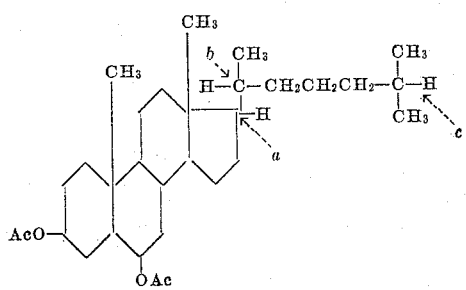

giving rise on oxidation, to the following compounds

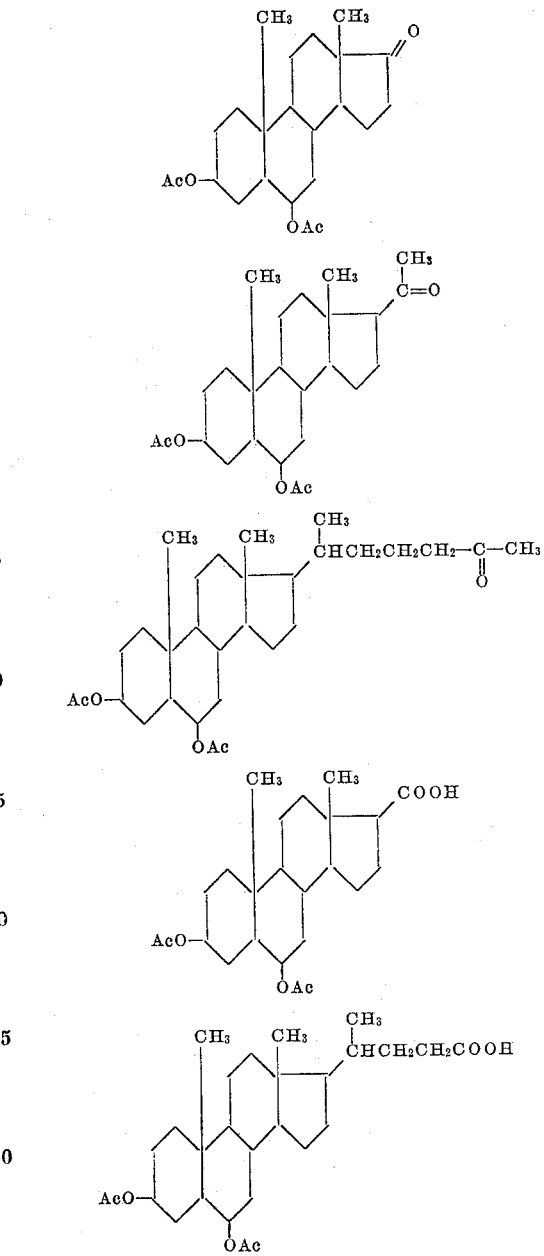

As oxidizing agents suitable for shortening the side chain by oxidative rupture it is generally most convenient to employ hexavalent chromium compounds such as chromic acid or potassium dichromate or heptavalent manganese compounds such as potassium or calcium permanganate, but other oxidizing agents capable of oxidatively rupturing carbon-carbon bonds may also be used. Among such agents are strong nitric acid, hydrogen peroxide, the combination of potassium chlorate and hydrochloric acid, etc. Likewise, the protection of the $C_3$ and $C_6$ hydroxyl groups may be achieved by the use of reagents other than acetic anhydride, e. g., etherifying or esterifying agents such as chlorosulfonic acid, methyl sulfate, ketene, benzoyl chloride, stearyl chloride, phthalic anhydride, phenylisocyanate, or any other such reagent acting to protect hydroxyl groups against oxidation and yet removable by hydrolysis. If a reagent like phthalic anhydride is used, the orthocarboxybenzoate ester thus formed may be oxidized in the form of its alkali metal salt, and in this case alkaline potassium permanganate may very suitably be employed as the oxidizing agent. Thus, the oxidizing conditions may be alkaline as well as acidic.

The modes of separation of acidic and neutral fractions from the oxidation mixture are not limited to those shown in the examples. Thus the acidic products may be separated from neutral products and from one another by the formation of sparingly soluble salts such as those derived from barium or lead. Again the neutral fraction may be separated into its components and/or from the acidic fraction by means of fractional crystallization of the products or their derivatives such as benzoates, semi-carbazones, oximes, etc., by conversion to water soluble derivatives, by fractional sublimation in a high vacuum, by chromatographic adsorption, by partition between immiscible solvents, etc. Furthermore, the hydrolysis of the protecting group at C₃ and C₆ may be carried out before or after separation of the oxidation mixture into its components.

It is further to be observed that the invention may be practiced on any 3,6-dihydroxysteroid, irrespective of its configuration. Thus, depending on the configuration, with respect to C₃, C₅, and C₆ of the 3,6-dihydroxy steroid employed in the practice of my invention, various nuclearly epimeric products may be obtained. Of these, the most valuable are those steroidal oxidation products representable without regard to configuration at C₃, C₅, or C₆, by the formulae

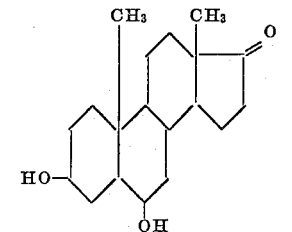

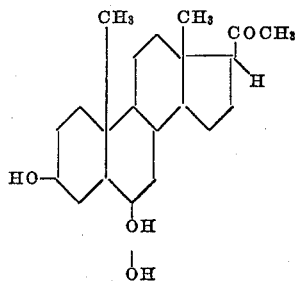

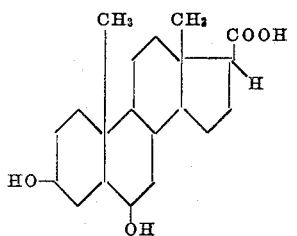

Some of the subject matter shown but not claimed herein is claimed in my copending application, Serial No. 359,161, filed September 30, 1940.

What I claim as my invention is:

1. Compounds of the formula,

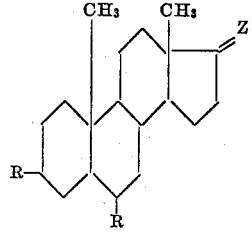

where R is selected from the class consisting of —OH and —O—acyl, and Z is a carbonyl-containing substituent selected from the class consisting of

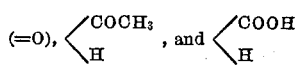

2. A steroidal oxidation product of the formula,

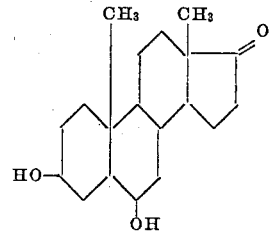

3. A steroidal oxidation product of the formula,

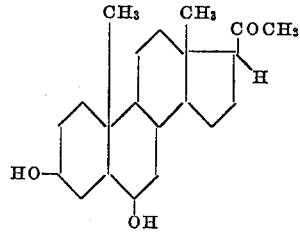

4. A steroidal oxidation product of the formula,

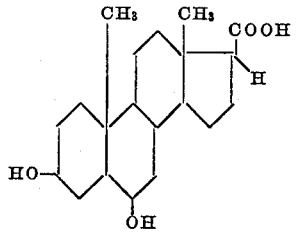

5. Androstanediol-3(β), 6-one-17 melting at approximately 205° C.

6. etio-Hyodesoxycholic acid melting at approximately 252° C.

7. Pregnanediol-3(α), 6-one-20, capable of forming a diacetate melting at approximately 100° C.

RUSSELL EARL MARKER.